Figures 1, 2:
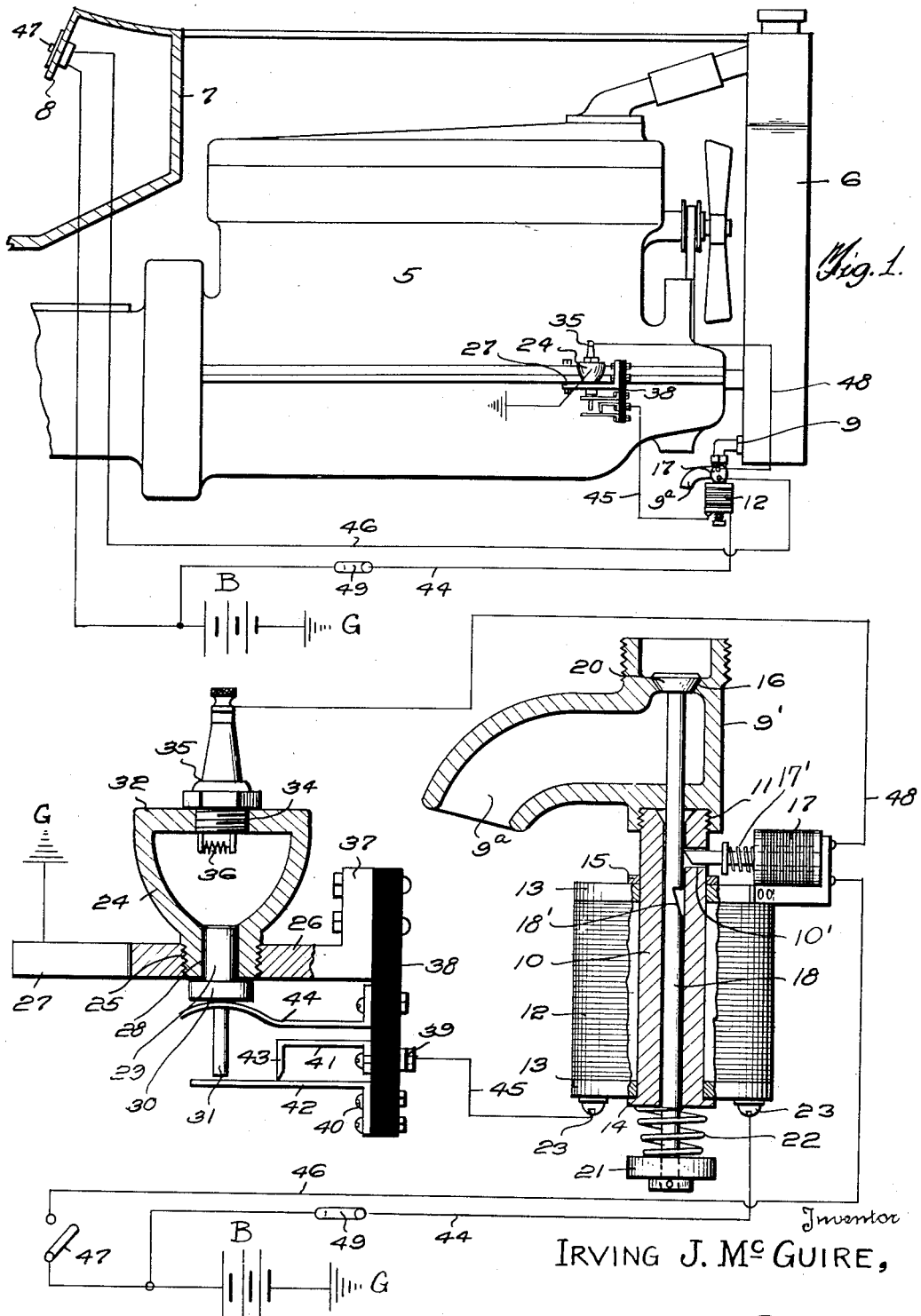

Aug. 29, 1933.     I. J. McGUIRE     1,924,250
AUTOMATIC DRAIN VALVE
Filed May 17, 1932

Inventor
IRVING J. McGUIRE,
By James N. Cryler
His Attorney

Patented Aug. 29, 1933

1,924,250

UNITED STATES PATENT OFFICE 1,924,250

AUTOMATIC DRAIN VALVE

Irving J. McGuire, Dolgeville, N. Y., assignor of thirty one-hundredths to Fred W. Walden, Toledo, Ohio Application May 17, 1932. Serial No. 611,895

3 Claims. (Cl. 137—34.3)

This invention relates to automatic drain valves for water systems containing water, and has for its object to promptly and completely drain such systems, in the event of a freezing temperature.

The freezing of water systems, such as the well known motor vehicle cooling systems, or the like, has resulted in enormous damage costs, and it is to avoid such freezing, due in part to lack of prompt attention and in many cases the rapid fall in temperature, by providing means whereby the entire system may be drained at its lowest point when the temperature first reaches the freezing point, and before the main body of liquid has become sufficiently cold to start freezing.

An object of the present invention is the provision of a valve so constructed that mechanism carried thereby will be actuated upon the lowering of the temperature to the freezing point, such mechanism acting to drain the system to which the valve is connected.

A further object is to provide such a valve, having mechanism, which, upon being actuated, instantaneously opens a valve for a complete drainage of the system before the liquid in such system has started to freeze.

A further and very important object of the invention resides in the provisions of an independent pressure actuated electric contact device for controlling and actuating the drain valve, such contact device actuated by the pressure caused by the freezing of water contained therein.

A further object of the invention resides in the provision of an electrical control switch that is actuated at the beginning of the freezing of a small body of water, but upon the complete freezing of such water will automatically break the circuit, to thereby avoid the discharging of the source of electrical energy, such as the conventional storage battery carried in the motor vehicle.

A further object is the provision of an automatic drain valve of extremely simple design, is strong, durable, cheap to manufacture, positive and rapid in actuation, and highly efficient in use.

Other very important objects and advantages of the invention will be apparent during the course of the following description.

In the drawing:

Figure 1 is a partly diagrammatic view of the drain valve and actuating means in use upon a motor vehicle, and Figure 2 is an enlarged view, partly in section and partly in elevation, of the complete mechanism.

In the drawing, the forward part of a motor vehicle is indicated, and embodies an engine 5, radiator 6, dash 7, and instrument panel 8. The structure just described is of a conventional nature, and the radiator is provided with the usual drain coupling 9 at its lowermost point. The coupling 9 has connection with a valve chamber 9', having a discharge spout 9", and this chamber 9' has connection with a tubular metallic core 10, through the medium of a screw-thread coupling 11. The core 10 extends above an electrical winding 12, having insulating ends 13. The core is suitably rigidly held with respect to the winding, by a shoulder 14 and lock collar 15. The chamber 9', adjacent its upper end, is provided with a tapered valve seat 16.

Mounted for reciprocation within the core 10 is a metallic stem 18 of smaller diameter than the inside diameter of the core 10, and preferably formed of brass or other insulator against magnetism. The stem 18 projects above and into the chamber 9', and in turn, is connected with a tapered valve 20, adapted for engagement with the seat 16. The stem 18 projects below the bottom of the core 10 and carries at its lower end, a metallic head 21, formed of iron or other magnetic material. A spring 22 normally urges the stem 18 downwardly for seating the valve 20. The winding 12 is provided with the usual wire attaching terminals 23.

When the winding 12 is energized and the stem 18 carrying the valve 20 is raised against the action of the spring 22, it becomes necessary to provide means for retaining the valve in raised position to insure of a complete drainage. For this purpose, a latch device is provided, comprising a solenoid magnet 17 having a spring projected core 17'. The outer end of the core 17' passes through an opening 10' of the core 10 and bears against the side of the stem 18. The stem 18 is provided with a notch 18'. It will thus be seen that upward movement of the stem 18 will permit the end of the core 17' to ride into the notch 18' under the influence of its spring. The core 17' is retracted for a release of the stem 18 by the energization of the magnet 17.

Means are provided for actuating the valve device through the medium of the winding 12, comprising a metallic pressure chamber 24 of cup-like formation, the walls of which are relatively thick. The lower or reduced end of the chamber 24 is screw-threaded for engagement within a threaded opening 25 of the arm 26 of a supporting bracket 27. The lower end of the chamber is provided with a relatively large smooth, vertical bore 28, for the reception of a reciprocatory plug 29 having a relatively large head 30 and a depending shank 31. The plug 29 has a snug sliding fit in the bore 28, providing a fluid-tight stop. The chamber preferably has a flat top 32, and is provided with a centrally arranged screw-threaded opening 34, adapted to be engaged by the screw-threaded end of a heater element 35. The element 35 is in the nature of a conventional spark plug, excepting that its sparking points are connected by a heater wire 36.

The bracket 27 has an upstanding arm 37, carrying a depending insulating plate 38, bolted or otherwise attached thereto. The plate 38 has bolted thereto, at 39 and 40, a pair of spring contact members 41 and 42. The member 41 has its end 43 downturned and normally bears against the surface of the contact 42. As shown, the contact 42 extends beneath the shank 31 and is normally slightly spaced therefrom. A leaf-spring 44, bolted to the plate 38, normally urges the plug 29 upwardly. Movement of the plug 29 downwardly will engage and separate the contacts 41 and 42. The chamber is adapted to be completely filled with water prior to assembly.

A source of electrical energy, such as a conventional storage battery, is indicated diagrammatically at "B". One side of the battery B is grounded, as at "G". A conductor wire 44 leads from the opposite side of the battery to one binding post 23 of the winding 12. A conductor wire 45 has connection with the other binding post of the winding 12 at one end, and the spring contact 41 at the other end. A conductor wire 46 is connected with the magnet 17 and the battery "B", and is provided with a suitable switch 47.

A conductor wire 48 leads from the opposite side of the magnet 17, and has connection with the heater element 35. The bracket 27, pressure chamber 24, and plug 29, are all suitably grounded to the frame of the automobile.

In use, assuming the parts to be in the normal positions shown, as the temperature falls to the freezing point, the body of water contained in the chamber 24 being relatively small, will freeze readily, and the pressure created by the expansion of the ice will force the plug 29 downwardly until the shank 31 engages the contact 42. Current is then permitted to flow from the battery "B" through wire 44, winding 12, wire 45, contact 41, contact 42, plug 29 and back to the ground through the frame-work of the car, thus energizing the winding 12 and causing the stem 18 to be drawn upwardly for unseating the valve 20. Thus the water will be permitted to drain from the cooling system. The energization of the magnet 12 is but momentary, but sufficient to move the stem and valve to open position, and permit the latch to engage the notch 18'. The downward movement of the plug first completes the circuit as described, but as the liquid continues to expand under the action of freezing, the plug 29 is forced further down until the contacts 41 and 42 are separated, at which time the magnet 12 is de-energized, and further drainage upon the battery is avoided.

When it is desired to refill the system, it first becomes necessary to restore the mechanism to normal position. To accomplish this, the operator closes the switch 47, permitting current to flow from the battery "B", wire 46, magnet 17, wire 48, heater element 35, and back to the ground "G", causing the magnet 17 to become energized and retracting the core against action of its spring for releasing the stem 18. The spring 22 will then immediately close the valve 20. At the same time, the heater coil 36 will glow and cause the ice in the chamber 24 to melt and permit the plug 29 to move upward under the action of the spring 44. After sufficient time has elapsed to permit the ice to melt, the operator opens the switch 47 and all parts remain in their normal position. If desirable, a cut-out switch 49 may be placed in the wire 44 for causing the parts to become inoperative.

The parts are obviously adapted to be enclosed in suitable protective coverings.

It will be seen, from the foregoing, that an extremely simple and efficient drain mechanism has been provided. The parts are of such nature as to require no attention, and are automatically controlled by the lowering of the temperature. The small body of water contained in the chamber 24 will freeze very much sooner than the main body of water in the cooling system, thereby creating internal pressure for actuating the plug 29. This internal pressure is further increased by the contraction of the metal of the chamber, such metal preferably being bronze or brass. The resetting of the mechanism requires but the closing of the switch 47 for a minute until the ice has melted, after which the parts function automatically for reset. Further, the danger of discharging the battery is avoided, since upon the freezing of the liquid in chamber 24, the flow of current is interrupted. The parts are extremely simple and of such nature as to need no attention and will not normally become disarranged.

It is to be understood that the invention is not limited to the precise construction set forth, but that it includes within its purview whatever changes fairly come within either the terms or the spirit of the appended claims.

Having fully described my invention, what I claim is:

1. A valve of the character described, comprising a solenoid magnet having a tubular core, a fluid discharge nozzle having a valve seat, coupling means between the nozzle and core, a valve rod operable through said core and carrying a valve at its upper end for normal engagement with said seat, said rod formed of nonmagnetic material and carrying a magnet head at its lower end, a spring for normally retaining the valve in closed position, a latch for engaging and holding the valve rod in its open position, a magnet for releasing the latch, a circuit maker and breaker for said solenoid magnet operable under the expansive influence of a body of freezing liquid, and an independent circuit for releasing said latch and restoring said maker and breaker to normal position.

2. An automatic drain valve for water systems, comprising a valve, electrical means for moving said valve to drain position, control means for said electrical means comprising a freeze chamber, a plug movable into and out of said chamber under the influence of a relatively small body of freezing liquid, electrical circuit making means operable upon the outward movement of said plug, circuit breaking means operable upon the continued outward movement of said plug, spring means normally tending to move said plug inwardly to inoperative position, heater means carried by said chamber for melting the body of liquid after freezing, the melting of said liquid permitting the said valve and control means to assume their normal inoperative position.

3. An automatic drain valve for automobile cooling systems, comprising a valve, electrical means for moving the valve to drain position, control means for said electrical means comprising a freeze chamber, a plug movable into and out of said chamber under the influence of a relatively small body of freezing liquid, spring contact members carried by the control means normally in contact with each other, one of said contact members adapted to be engaged by the said plug in its outward movement for completing an electric circuit to said electrical means of the valve, said contact members adapted to be separated upon the continued outward movement of the plug for interrupting the said circuit, spring means for normally urging said plug inwardly of said chamber, and an electric heater carried by said chamber for melting the frozen liquid.

IRVING J. McGUIRE.